Patented Sept. 11, 1923.

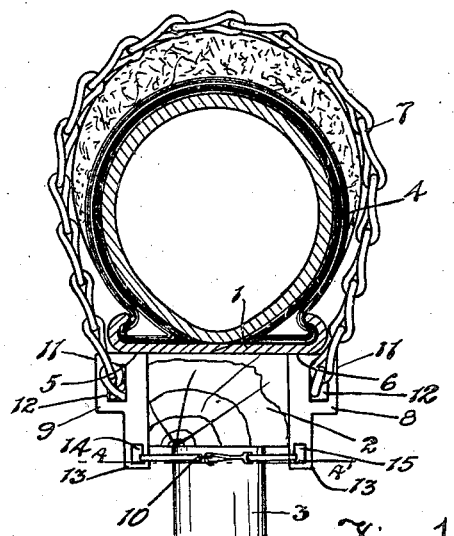
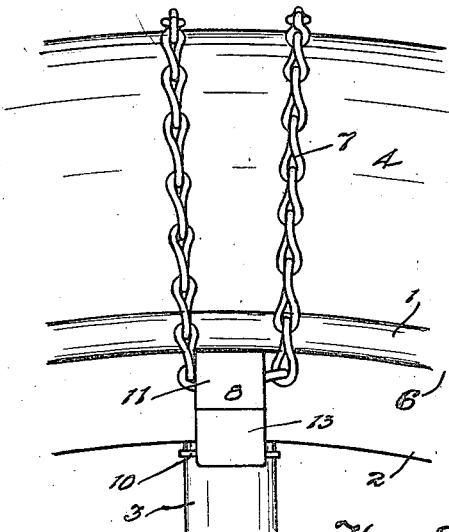
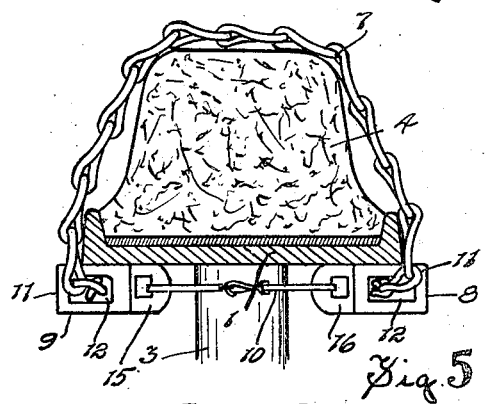
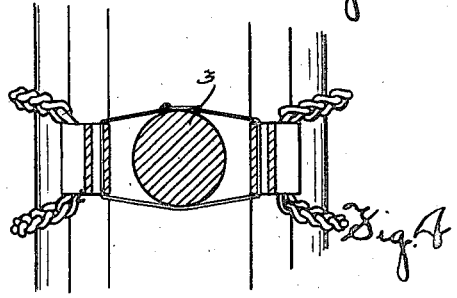
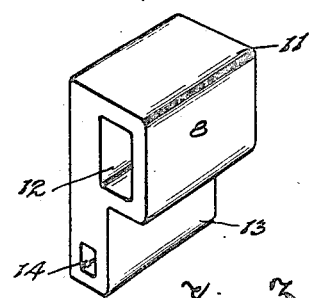
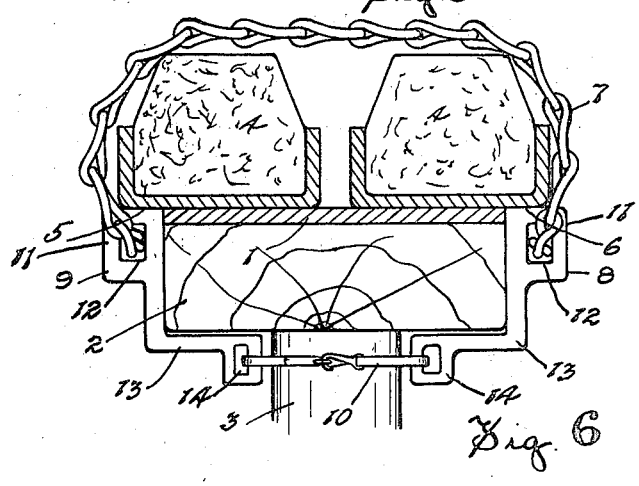

1,467,647

UNITED STATES PATENT OFFICE.

HUGH RACEY PATRIARCHE, OF WINNIPEG, MANITOBA, CANADA.

ANTISKIDDING DEVICE.

Application filed March 14, 1921. Serial No. 452,142.

*To all whom it may concern:*

Be it known that I, HUGH RACEY PATRIARCHE, a subject of the King of Great Britain, and a resident of the city of Winnipeg, in the Province of Manitoba, Canada, have invented new and useful Improvements in Antiskidding Devices, of which the following is the specification.

The invention relates to improvements in anti-skidding devices for wheels and especially for automobile or truck wheels and an object of the present invention is to provide an anti-skidding device of the type previously patented by me under United States Patent No. 1,333,873, dated March 6th, 1920, having the same anti-skid qualities but constructed so that the pull of the chain is not taken up or counteracted by the spoke but transferred directly to the rim, felly or such like part of the wheel.

A further object is to construct the appliance in a simple, durable and inexpensive manner and so that it can be easily applied on the wheel and removed therefrom whenever desired without changing the construction of the wheel or marring or injuring the same.

With the above more important objects in view the invention consists essentially in the arrangement and construction of parts hereinafter more particularly described and later pointed out in the appended claim, reference being had to the accompanying drawing in which:—

Figure 1 is a transverse sectional view of a part of a tire and wheel showing the application of my invention thereto.

Fig. 2 is a side view of the parts as they appear in Fig. 1.

Fig. 3 is a perspective view of one of the side mountings.

Fig. 4 is a sectional view through a spoke and through the side mountings and looking towards the felly.

Fig. 5 is a sectional view through a different type of wheel showing a modified construction of the appliance.

Fig. 6 is a sectional view through another type of wheel showing a further modification of the appliance.

In the drawing like characters of reference indicate corresponding parts in the several figures.

I will initially describe the structure as appearing in Figures 1, 2, 3, and 4.

1 represents the rim of the wheel, 2 the felly, 3 one of the spokes and 4 the automobile tire which is mounted on the rim in the customary manner. In most automobile wheels the rim is wider than the felly so that there are two internal continuous shoulders formed at 5 and 6, these shoulders being actually those portions of the rim which project at the sides beyond the felly.

The anti-skid device which I provide embodies a looped gripping member 7 such as a continuous chain, two side mountings 8 and 9 and a fastening element 10. The chain 7 is of such a length that when the loop is passed over the tire the ends of the loop lie more or less adjacent the sides of the felly of the wheel.

On the chain loop the mountings are placed. These mountings are similarly constructed, each comprising a substantially rectangular head 11 fitted with an opening 12 to slidably receive the chain and supplied with an extension or tail piece 13 also provided with an opening 14 to slidably receive the fastening 10. This fastening 10 is shown in the drawings as a leather strap fitted with a fastening buckle but a chain could be substituted if desired provided a snap hook or something of the kind is supplied to fasten the ends of the said chain. The mountings are constructed so that when applied on the wheel in the manner as best shown in Fig. 1 they lie flat against the sides of the felly with the heads butted against the shoulders 5 and 6 and the tail pieces extending inwardly beyond the felly so as to allow the fastening 10 to pass across the felly and around the spoke.

In actual practice the whole appliance is designed so that it fits fairly snugly. From the arrangement shown it will be apparent that when the wheel is in use the traction pull of the chain will draw the heads of the mountings towards the shoulders so that the said pull is counter-acted by the rim and the fastening 10 is to all intents and purposes relieved of any such pulling strain and simply acts as an anchor between the tail pieces and to the spoke.

By observing Fig. 1 it will be seen that the pull of the chain will attempt to produce a rotary action resulting in an out-swinging effort on the part of the tail pieces which is offset by the fastening 10 so that all the work the said fastening has to do is to prevent this rotary action and prevent any lateral or circumferential shifting of the mountings in respect to the felly.

I wish also to point out that once the anti-skidding device is properly adjusted I maintain two tread grips at all times as there is no tendency for the tread loops of the chains, which pass over the tire, coming together. To explain this, it will be seen that when the leading loop engages the road surface it will tend to move ahead and at the same time will produce a pull in the following loop which binds the trailing loop more tightly around the tire.

When the following loop engages the road surface a reverse action occurs so that there is always a tendency under working conditions for one or the other of the loops to grip the tire. By having the chain in the form of a continuous loop and with the links so that they can slide through the openings 12 I obtain the same wearing advantages as previously disclosed in my prior patent.

In some instances there is no felly in a wheel, the spokes, usually metal ones, being directly attached to the rim. This condition is shown in Figure 5. Here it will be observed that the rim is comparatively wide in respect to the spoke. In such a case the mountings can lie flat on the inner side of the rim and instead of being provided with tail pieces they are supplied with eyes 15 and 16 which receive the fastening 10. The chain passes through the heads of the mountings and over the tire in the same manner as already explained and the action in this arrangement is the same as in the first way, viz:—the traction pull of the chain is counter-acted by the rim and relieved from the fastening 10.

In Fig. 6 I have shown a further modification as may be required for a heavy truck wheel which presents a rim and felly but where the felly is comparatively wide in respect to the spoke. In this case the heads of the mountings engage the rim but the tail pieces, instead of being comparatively short as in Fig. 1, are considerably longer and have their extending ends turned inwardly towards the spoke where they are fitted with the opening for the fastening.

In reality this modification is simply an extension made to accommodate the increased width of felly which the type of wheel presents. I have shown the modified forms in order to clearly bring out the feature that my mountings can be made to suit the requirements of existing wheels whilst maintaining the essential feature of having the mounting butting a solid part of the wheel which takes up the traction pull of the chain and relieves the spoke of the same.

What I claim as my invention is:—

In an anti-skidding device for automobile wheels, an anti-skidding loop adapted to extend across the tread portion of the wheel with the ends of the loop lying adjacent the rim of the wheel, a mounting at each side of the wheel comprising an integral body having a pair of passages therethrough, extending in the circumferential direction of the wheel, one of said passages receiving one end of the loop therethrough, and a fastening element passing through the remaining passages of the mountings, said mountings serving through engagement with a portion of the wheel to sustain the outward pull thereon to prevent transmission of such pull to the fastening means connecting the mountings together.

Signed at Winnipeg, this 23rd day of February, 1921.

HUGH RACEY PATRIARCHE.

In the presence of—
GERALD S. ROXBURGH,
K. B. WAKEFIELD.